United States Patent [19]

Webb

[11] 3,953,170

[45] Apr. 27, 1976

[54] DUMP TRUCK WITH EJECTOR BLADE

[75] Inventor: James O. Webb, New Castle, Ind.

[73] Assignee: Golay & Co., Inc., Cambridge City, Ind.

[22] Filed: Oct. 25, 1974

[21] Appl. No.: 518,080

Related U.S. Application Data

[63] Continuation-in-part of Ser. No. 355,426, April 30, 1973, abandoned.

[52] U.S. Cl................................... 214/82; 100/295
[51] Int. Cl.² ........................................... B60P 3/00
[58] Field of Search.................. 214/82, 510, 146 E, 214/83.3; 100/295

[56] References Cited

UNITED STATES PATENTS

| | | | |
|---|---|---|---|
| 2,800,234 | 7/1957 | Herpich et al. | 214/82 |
| 3,273,728 | 9/1966 | Kelso | 214/82 |
| 3,815,764 | 6/1974 | Gilfillan | 214/82 |

FOREIGN PATENTS OR APPLICATIONS

| | | | |
|---|---|---|---|
| 1,057,013 | 2/1967 | United Kingdom | 214/82 |

*Primary Examiner*—Albert J. Makay
*Attorney, Agent, or Firm*—Jenkins, Hanley & Coffey

[57] ABSTRACT

A material handling system comprising a mobile longitudinally extending receptacle having a bottom, side walls, forward end wall and pivotally movable end gate. Inside the receptacle is a pusher blade extending generally from side to side, the pusher blade being mounted for longitudinal movement between a first position adjacent the forward end of the receptacle and a second position adjacent the rear end of the receptacle. A hydraulic system is used to move the pusher blade. The blade is mounted for movement by a system including, at each side of and within the receptacle and extending longitudinally therealong, a lower upwardly facing guide track and an upper downwardly facing guide track. Slide blocks are mounted on the blade to bear against these tracks. The blade is shaped to move the material inwardly from the sides, downwardly from the top and upwardly from the bottom as the blade moves rearwardly. This causes a draft on the material along the sides and bottom to force the material inwardly and then rearwardly rather than outwardly.

3 Claims, 9 Drawing Figures

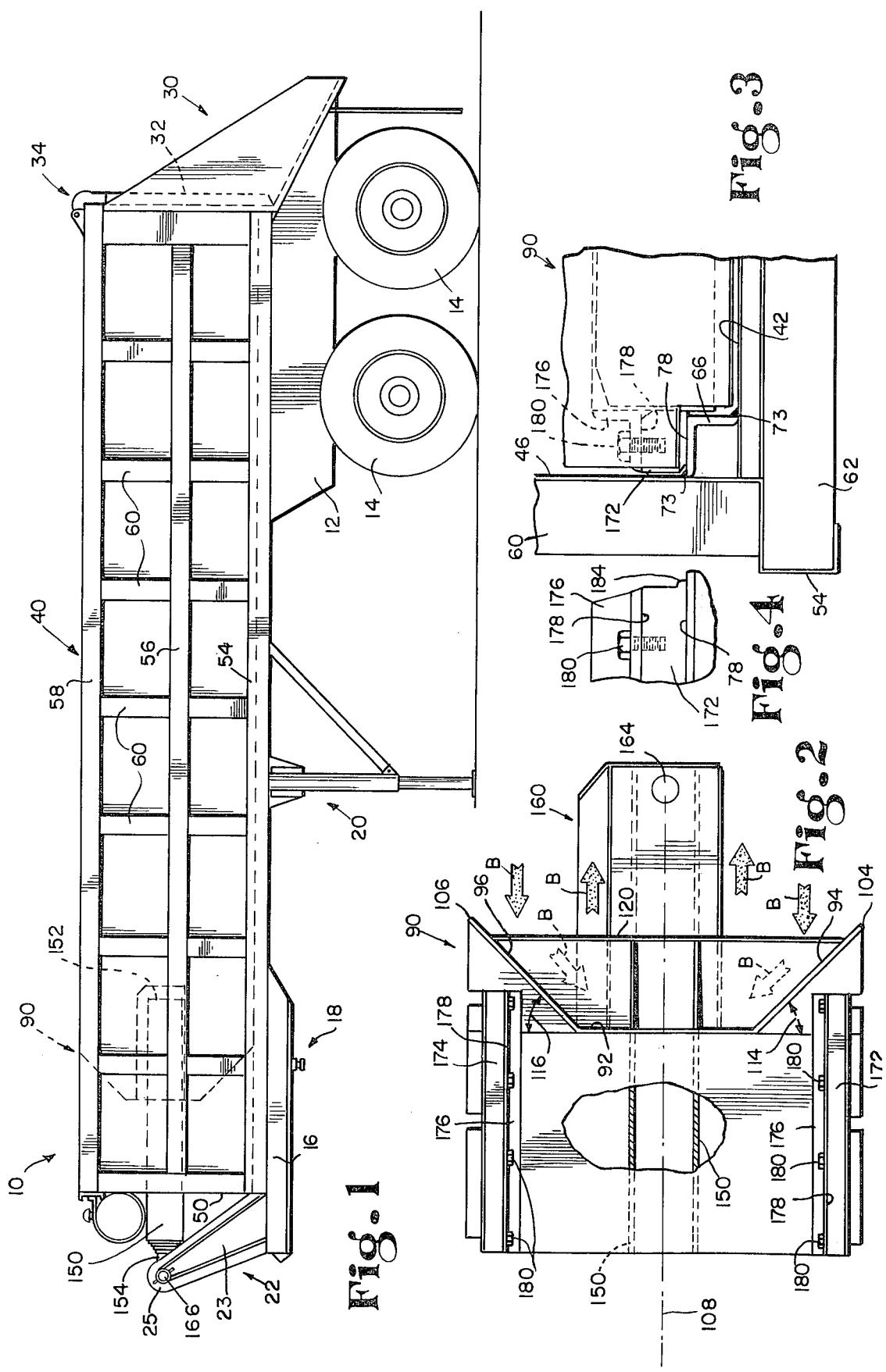

DUMP TRUCK WITH EJECTOR BLADE

This is a Continuation-in-Part application based upon my pending application Ser. No. 355,426 filed Apr. 30, 1973, now abandoned.

It is a primary object of my present invention to provide a dump truck for hauling particulate material such as sand and gravel and hot asphalt mix, which truck does not have to be tilted upwardly to dangerous heights in order to unload the material.

The material handling system of my present invention comprises a mobile receptacle provided by a bottom having longitudinally extending sides, a rear end, a forward end, upwardly extending side walls attached, respectively, to the sides and an end gate adjacent the rear end. I mount a pusher blade in the receptacle to extend generally from side to side and then provide motor means, such as a hydraulic power assembly including a plurality of telescopically related power cylinders, for longitudinally moving the blade between a first position adjacent the forward end and a second position adjacent the rear end. When the receptacle is loaded, the pusher blade is adjacent the forward end. The receptacle is unloaded by opening the rear end gate and moving the pusher blade rearwardly.

Other people have heretofore suggested pusher blade systems for unloading particulate material trucks and particularly sand, gravel and asphalt trucks. The systems shown in U.S. Pat. Nos. 3,273,728; 3,285,440; and 2,047,602 are, I believe, representative of the types of systems which have heretofore been suggested.

To my knowledge, and the knowledge of my employer who has been in the business of manufacturing and selling all sorts of dump truck beds for many years, no one has heretofore successfully manufactured and sold such an unloading system for use in trucks which haul sand, gravel and asphalt. Prior to my present invention, I have never seen a sand, gravel or asphalt truck or a particulate material truck of any kind which includes a blade movable within the bed of the truck to push the material from the rear end of the truck.

Importantly, there are many tremendous functional and safety advantages to a system such as the system I have disclosed and claimed herein.

For instance, in many instances, it is rather unsafe to tilt the bed of a 20 to 25 foot dump truck upwardly to an angle sufficient to get the material to flow rearwardly out the end gate. This is particularly true when the surface on which the truck is sitting is not particularly stable or capable of supporting concentrated loads. Personnel have been injured and equipment has been greatly damaged because of the heights to which the truck beds are tilted. With my system, the horizontal center of gravity remains low during all phases of operation, thereby making operations on side slopes and uneven terrain possible.

Further, it is not at all economical to haul small loads of hot asphalt mix from the asphalt plant to an asphalt spreader being used in constructing a road. Yet, in many cases, it is necessary to use the smaller (shorter) dump trucks because the larger (longer) dump trucks cause too much damage to overhanging trees, wires, traffic signals and the like when the larger trucks are moved along roads with the spreaders while their beds are elevated. This is particularly true within populated areas.

Further, with my system, the rate at which the material is ejected from the rear end of the trailer can be carefully controlled by controlling the hydraulics which moves the blade rearwardly. This is in contrast to tilting the bed upwardly so that material will flow out the rearward end at a rate determined by the cohesiveness of the material, frictional forces, height to which the bed is tilted and movement of the truck.

I believe that one of the primary reasons my invention is successful is the shape of the pusher blade which I disclose and claim herein and which is different from the blade shapes heretofore disclosed. I prefer that the pusher blade have a generally rectangular central body portion extending laterally and vertically and facing the rear end of the truck bed. I then provide a laterally extending rigid lower portion inclining downwardly and rearwardly from the central body portion to the bottom of the bed and a laterally extending rigid upper portion inclining upwardly and rearwardly from the central body portion. I also provide vertically extending rigid side portions inclining outwardly and rearwardly from the opposite sides of the central body portion to the side walls of the truck bed. The side portions preferably incline outwardly and rearwardly at substantially the same angle. The upper portion preferably inclines upwardly and rearwardly at substantially the same angle as the lower portion inclines downwardly and rearwardly. This blade construction is such that, when the blade moves rearwardly, the blade relieves and moves material from the side walls and bottom by creating a draft on the material along the side walls and bottom by forcing the material initially inwardly and then rearwardly. This prevents forcing the material outwardly against the side walls. The upwardly and rearwardly inclining upper portion of the blade similarly turns the material downwardly toward the longitudinal center of the truck bed rather than upwardly.

The purpose of the blade configuration of the present invention is to start the material moving toward the center of the blade from the sides, bottom and top during the first movement of the blade to compress the material. Once the material is compressed, further movement of the blade will tend to move the material as a block toward the rear of the receptacle. The converging forces caused by the shape of the blade is accompanied by some perceptible movement of the material in the directions of the vectors of the forces produced by the shape of the blade, gravity and the compression forces within the material. Without such convergence of forces toward the center of the blade, the material would flow over the top walls of the receptacle or simply push out the sides of the receptacle. It is to be understood that the present invention is limited to an open top receptacle such as a conventional gravel truck, i.e., a receptacle which does not have a restraining top roof or a roof capable of preventing movement of the material upwardly and over the sides of the receptacle. In many cases, it may be desirable to have a cover such as a tarpaulin over the top of the receptacle, for instance, to hold the heat in hot asphalt mix, but I consider such receptacles to have an open top for purposes of this invention.

The action of the blade shape upon the material may best be described as a force centralization or a centering of the forces toward the center line of the blade to reach equilibrium so that the material can move as a block. It has been discovered that, even with shallow loads, when the blade is first moved toward the rear of the receptacle, the material will rise until the upper portion of the blade is effective to cause the downward forces on the material to be in equilibrium with the upward forces on the material. At that point, the material starts to move toward the rear of the receptacle as the blade moves. The action, then, is a compression equalization between the blade and the load. It is significantly different from the type of action found in a refuse truck blade which is configured to roll the refuse upwardly from the bottom floor to fill the upper corners of the closed top receptacle. Refuse containers have a restraining top roof.

While it may be preferable to have the upper portion inclining upwardly and rearwardly at substantially the same angle at which the lower portion inclines downwardly and rearwardly, it will be understood that this is a matter of proportions and that force equilibrium may be established with different angles and different dimensioned upper and lower portions as long as the upwardly directed force vectors are in equilibrium with the downwardly directed force vectors. The equations for making such determinations will be discussed in more detail hereinafter.

It has long been felt that a system such as I have disclosed and claimed herein for unloading hot asphalt mix would merely cause the hot asphalt mix to flow upwardly and over the side walls of the truck bed. Truck beds incorporating my present system and which are 21 feet in length, 7⅓ feet wide and 3⅔ feet deep are successfully being used to unload large quantities of asphalt mix.

Another reason I believe my system is successful is because I keep the means which mounts the pusher blade for longitudinal movement between a first position adjacent the forward end of the truck bed and a second position adjacent the rear end of the truck bed within the receptacle and extending longitudinally along each side thereof. Particularly, I provide mounting means including, at each side of and within the receptacle and extending longitudinally therealong, a lower upwardly facing guide track and an upper downwardly facing guide track, a lower slide block riding each upwardly facing track and an upper slide block bearing against each downwardly facing track, first means for rigidly connecting each lower slide block to the adjacent lower side portion of the blade and second means for rigidly connecting each upper slide block to the adjacent upper side portion of the blade. I prefer to have the slide blocks extend longitudinally a distance approximately equal, for instance, to two-thirds the height of the blade to maintain equal loading and alignment of the blade. I prefer that the slide blocks be adjustably mounted upon the blade to compensate for wear and to facilitate maintaining equal loading and alignment at all times. This guide track and slide block mounting system for the pusher blade works particularly well in unloading hot asphalt mix which is well known to be sticky and difficult to handle.

Other objects and features of my present invention will become apparent as this description progresses.

To the accomplishment of the above and related objects, this invention may be embodied in the form illustrated in the accompanying drawings, attention being called to the fact, however, that the drawings are illustrative only, and that changes may be made in the specific construction illustrated and described, so long as the scope of the appended claims is not violated.

In the drawings:

FIG. 1 is an elevational view of a truck bed outfitted with my unloading system;

FIG. 2 is an enlarged elevational view of my pusher blade assembly;

FIG. 3 is an enlarged, fragmentary sectional view showing my preferred guide track and slide block mounting arrangement for the blade;

FIG. 4 is a fragmentary sectional view showing the nose portion of one slide block;

Figure 5:
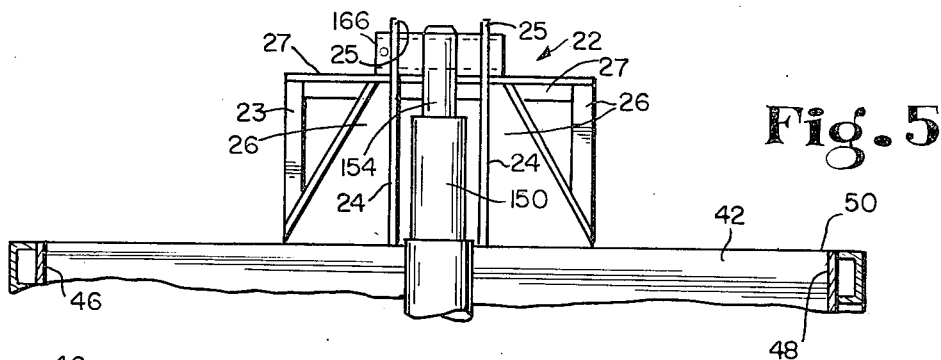
FIG. 5 is a fragmentary and reduced view looking downwardly at the left-hand end of FIG. 1.

Referring now to the drawings, it will be seen that I have illustrated a trailer 10 comprising a rear frame portion 12 supported by rear wheels 14 in a conventional manner and a forward frame portion 16 carrying the usual connecting pin 18 which is engaged by the conventional fifth wheel on a tractor. I also show a conventional retractable auxiliary support 20 for use in supporting the trailer 10 when the tractor is removed. At the forward end of the forward frame portion 16 is support means 22 including a support frame 23 which extends forwardly and upwardly as best seen in FIG. 1 and which is laterally narrow and centrally located as best seen in FIG. 5.

The frame 23 includes, in the illustrative embodiment, a pair of laterally spaced apart, parallel plate members 24, each of which projects forwardly and upwardly to provide a distal end portion 25. As this description progresses, it will be seen that the support means 22 anchors one end of the hydraulic power assembly for the movable blade of my system. In order to provide lateral structural strength for the plate members 24, I use side structural members 26 and forward structural members 27, all welded together and to the plates 24 and the frame portion 16.

I obtain an important advantage by having the support means 22 laterally narrow and centrally located on the trailer 10. Particularly, I can use a tractor (not shown) with a standard wheel base to pull the trailer 10. With a standard wheel base, the support means 22 will project rather close to the back of the cab of the tractor, but it will not interfere with the cab when the trailer 10 is turned about the connecting pin 18. If the support means 22 were as wide as the trailer 10, the laterally outer edges would interfere with the cab of a tractor having a standard wheel base.

Thus, the laterally narrow and centrally located support means 22 permits me to hold down the overall length of the system (tractor and trailer 10), and yet provide the necessary excursion for the movable ejector blade of the present invention as will be described hereinafter.

Also shown in FIG. 1 is the usual rear end gate system 30 including the end gate 32 which is pivotally supported for swinging movement about a horizontal axis as indicated at 34.

The trailer 10, therefore, comprises a receptacle 40 provided by a bottom or floor 42 having longitudinally extending sides, a rear end, and a forward end, side walls 46, 48 attached, respectively, to the sides of the bottom and a front end wall 50. The gate 32 closes the receptacle at its rearward end.

Figure 7:
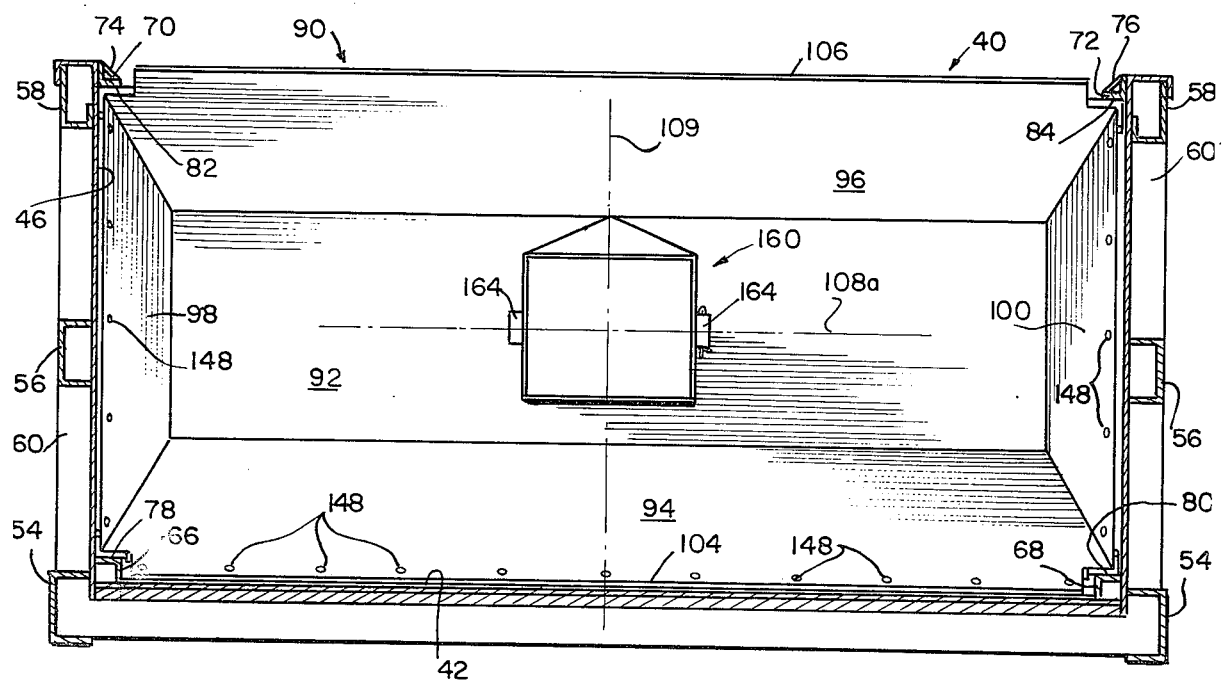
FIG. 7 is a sectional view taken along a plane extending vertically and transversely through the truck bed and looking forwardly at the pusher blade.

Each of the side walls 46, 48 includes longitudinally horizontally extending structural members 54, 56, 58 as well as longitudinally spaced apart, vertically extending structural members 60. Extending between the lower edge portions of the side walls 46, 48 and under the floor 42 are structural members 62. These structural members 54, 56, 58, 60, 62 comprise the main structural members of the trailer 10 connecting the rear frame portion 12 to the forward frame portion 16. Additionally, as best seen in FIG. 7, I place an angle iron 66, 68 at the juncture between each side wall 46, 48 and the floor 42 to extend longitudinally therealong and other angle irons 70, 72 at the upper edges of the side walls to extend longitudinally therealong parallel to the first-mentioned angle irons 66, 68. These angle irons are welded as suggested at 73 in FIG. 3 to the structural members and panel members forming the side walls and bottom so that they become load-bearing support members for the trailer 10. It will be seen that I provide a cover plate 74, 76 extending along each angle iron 70, 72 and strengthening the horizontally extending flange of that angle iron.

In addition to providing strength for the trailer 10, the angle irons 66, 68, 70, 72 provide blade mounting means including, at each side of and within the receptacle 40 and extending longitudinally therealong, a lower, upwardly facing guide track 78, 80 and an upper, downwardly facing guide track 82, 84. A pusher blade assembly 90 is supported on and by these guide tracks 78 – 84 for movement longitudinally within the receptacle 40.

Figure 6:
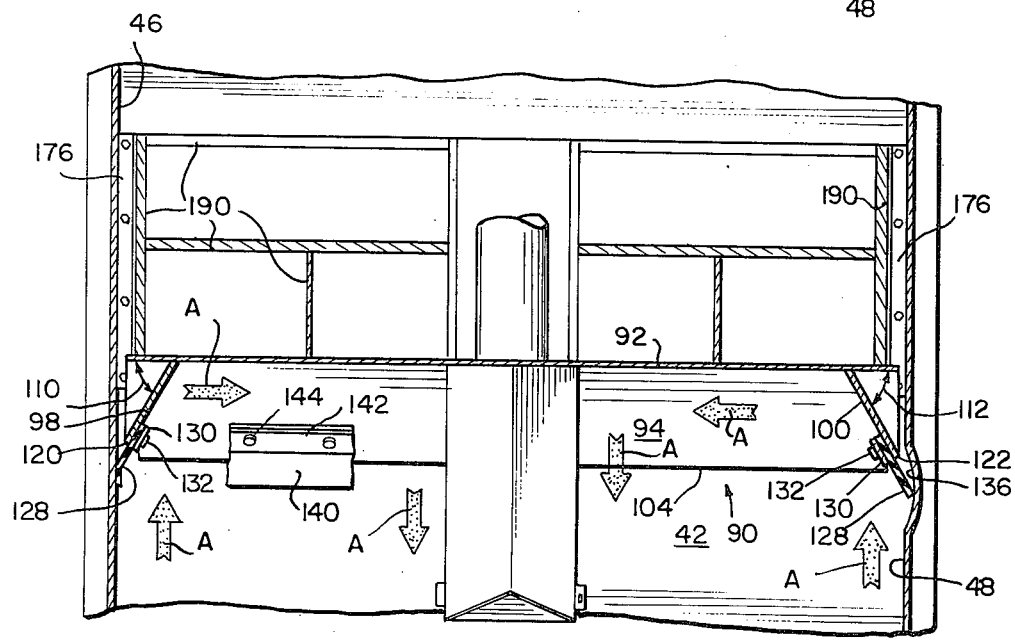
FIG. 6 is a fragmentary sectional view of a pusher blade assembly and a portion of the truck bed taken along a plane which extends longitudinally and horizontally through the blade assembly.

The blade assembly 90 includes a rearwardly facing blade having a rectangularly shaped, laterally and vertically extending and rearwardly facing central body portion 92 best seen in FIGS. 2, 6 and 7. The blade further has a laterally extending rigid lower portion 94 inclining downwardly and rearwardly from the central body portion to the bottom 42, a laterally extending rigid upper portion 96 inclining upwardly and rearwardly from the central body portion 92, and vertically extending rigid side portions inclining outwardly and rearwardly from the opposite sides (lateral ends) of the central body portion to the side walls 46, 48. The side portions 98, 100 incline outwardly and rearwardly at substantially the same angle, and the upper portion 96 inclines upwardly and rearwardly at substantially the same angle as the lower portion 94 inclines downwardly and rearwardly.

As best seen in FIG. 2, the lower, rearward edge 104 of the lower portion 94 lies in a common vertical plane with the upper rearward edge 106 of the upper portion 96. In FIG. 2, I show a center line 108 which lies in the same center plane as the center line 108$a$ shown in FIG. 7. In FIG. 7, I show a center line 109 representing a longitudinally and vertically extending center plane. It will be appreciated, therefore, that the upper portion 96 and lower portion 94 are allochirally related relative to the center plane 108$a$ and that the side portions 98, 100 are allochirally related relative to the center plane 109. This means that the angles 110, 112 in FIG. 6 are equal and that the angles 114, 116 in FIG. 2 are equal. I prefer that the angles 110, 112 be approximately 60° while the angles 114, 116 be approximately 45°. I have found that these angular dimensions are satisfactory for a blade, the total height of which is approximately 44 inches and the total width of which is approximately 87 inches. Such a blade works well in the aforedescribed trailer which is 21 feet in length, 3⅔ feet in depth and 7⅓ feet in width.

While the above provided dimensions work quite satisfactorily, it will be appreciated that they are not so critical that they cannot be changed within limits as established by equilibrium equations hereinafter to be discussed. For instance, as an approximation, in referring to the side view of FIG. 2, the three portions 92, 94, 96 may be approximately equal in height from their lower edges to their upper edges. That is, from the bottom to the top of the blade, one-third of the blade is the lower portion 94, one-third of the blade is the central vertical portion 92, and one-third of the blade is the upper portion 96. This approximation, of course, results from having the angles 114, 116 approximately 45°.

Figure 9:
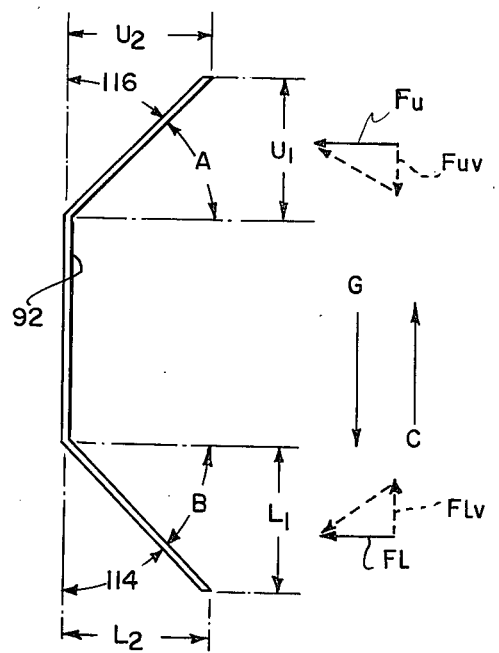
FIG. 9 is a force diagram showing the forces acting on the material as a result of the blade shape.

Referring now to the diagrammatic view of FIG. 9, it will be seen that the major force vectors acting on the blade 90 and on the bulk material in the vicinity of the blade are illustrated, $F_U$ and $F_L$ being the horizontal forces on the upper and lower angled portions of the blade face, respectively, G being the material gravity force, and C being the vertical force imposed on the material by compression in the only physically unrestrained direction, i.e., upwards. Also identified in FIG. 9 are dimensions pertinent to the performance of the blade, to wit: $U_2$, $U_1$, $L_2$, $L_1$, angle A and angle B.

The design of the blade profile has, in general, a two-fold purpose. The first purpose, and the most important, is to prevent the material being discharged from rolling or spilling over the sides or past the blade during discharge. Another purpose is to balance the forces acting on the blade so as to permit smooth traverse of the blade, minimum friction on the slides, and minimum reinforcement of the restraining rails.

Forces G and C depend on the properties of the material, such as density, cohesiveness, compressibility, fluidity, etc. The effect of these particular properties on the required blade angles and other dimensions may be determined by experiment.

The objective in the design of the upper portion 96 of the blade, i.e., angle A and dimensions $U_2$, $U_1$, is to exert a downward force on the material in the vicinity of the blade to counteract force C and thus prevent the material from spilling over the blade during discharge. The size of angle A and dimensions $U_1$ and $U_2$, required to achieve this condition depend on the material properties mentioned above. The lighter, least cohesive materials would require the highest restrictive vertical force, i.e., smaller angle A and larger dimension $U_2$.

There are several objectives for the design of the lower portion 94 of the blade 90, i.e., angle B and dimensions $L_1$, $L_2$. One objective is to equalize or nearly equalize the vertical forces imposed on the blade. Another objective is to relieve compression forces which would tend to buckle or distort the receptacle floor. Still another objective is to establish a discharge plane for the material when the blade is at the rear end of the receptacle.

A force vector analysis of the material in the vicinity of the blade is as follows:

Assume that the pressure P is the average pressure on the face of the blade during dishcarge, then $F_U = P \times U_1$ × W where W is the width of the blade and $F_L = P \times L_1 \times W$. The magnitude of the vertical force components $F_{UV}$ and $F_{LV} = F_U \tan(90° - A)$ and $F_L \tan(90° - B)$ respectively. Therefore, $F_{UV} = PU_1W \tan(90° - A)$ and $F_{LV} = PL_1W \tan(90° - B)$. In order to control the flow of material relative to the blade, and thus prevent spillover, $F_{UV} + G$ must be equal to or exceed $F_{LV} + C$. By assuming that forces G and C are not significant or that they are equal, angle B and dimension $L_1$ required to equalize vertical forces can be determined by the following equation:

$$L_1 \tan(90° - B) = U_1 \tan(90° - A).$$

It should be noted that hydrostatic principles were assumed to apply in determining forces on the bulk material. While this might not be a truly valid assumption, it is believed that the approximations derived therefrom are adequate for this analysis.

An angle A of 45° and a dimension $U_1$ of 12 inches has been found to be acceptable for road construction materials such as sand, gravel, asphalt, etc. Angle B and dimension $L_1$ do not have to be 45° and 12 inches, respectively; however, the equation $L_1 \tan(90° - B) = 12$ should apply. In other words, the angles A, B and the dimensions $U_1$, $U_2$ and $L_1$, $L_2$ may be varied in accordance with these above-presented equations to keep $F_{UV}$ equal to, or perhaps, slightly exceeding $F_{LV}$. Another consideration in the design of the lower portion 94 of the blade is that if angle B is much greater than angle A and, consequently, the dimension $L_1$ is much longer than the dimension $U_1$, then the effective source of force $F_{LV}$ could be so high up the blade 90 that it could cause force G to be ineffective in the immediate proximity of the blade. The consequence of this would be an inequality of vertical force in the upward direction.

The effect of the angled side portion 98, 100 are similar to those discussed for the lower portion 94 and particularly the side portions serve the purpose of relieving compression forces that would tend to distort or buckle the sides of the receptacle.

The rearward edges of the side portions 98, 100 are indicated at 120, 122 in FIG. 6. Preferably, and as illustrated in FIG. 6, I provide flexible seal means extending along the rearward edges 120, 122 of the side portions 98, 100 and along the rearward edge 104 of the lower portion 94 to engage and scrape material from the side walls 46, 48 and bottom 42 as the blade assembly 90 moves from its first position adjacent the forward end of the trailer to its second position adjacent the rearward end of the trailer, the seal means resiliently engaging the side walls and bottom to maintain contact with portions thereof which are concave and convex. In FIG. 6, the illustrative sealing means includes flexible sealing strips 128 which are connected to the rearward edge portions of the side portions 98, 100 by metal strips 130 and fastening elements 132. The sealing strips 128 may be rubber or rubberlike or even metal. The strips 128 are positioned such that they are resiliently bent as shown at the left-hand side of FIG. 6. When the strip 128 encounters a concave indentation such as indicated at 136 at the right-hand side of FIG. 6, the strip will straighten out to remain in contact with the surface of the side wall. If the indentation is convex, the strip will yieldably move inwardly to follow that indentation. Similarly, I provide a sealing strip 140 extending along the rearward edge 104 and fastened thereto by means of a metal strip 142 and fastening elements 144. (Only a fragment of the sealing strip 140 is shown in FIG. 6 for convenience.) The strip 140 will similarly be arranged resiliently to engage the bottom surface 42. In FIG. 7, I show the mounting holes 148 for use with the fastening elements 132, 144.

Figure 8:
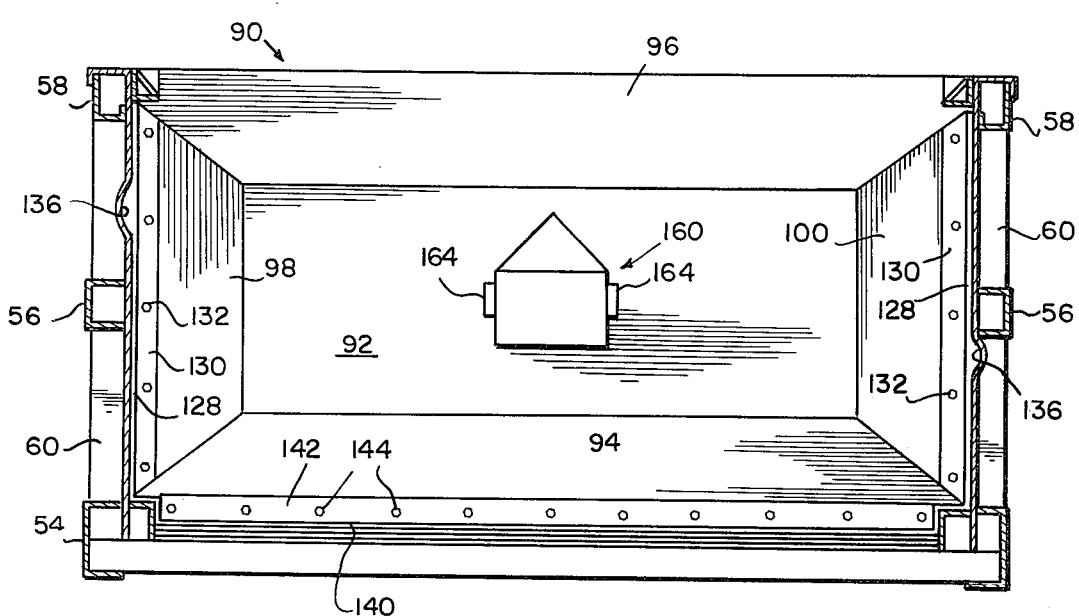
FIG. 8 is a sectional view similar to FIG. 7 and designed to show the sealing strips which engage the bottom and the sides and the manner in which such strips will accommodate irregularities in the bottom and side surfaces.

Referring now to FIG. 8, it will be seen that I have shown, from another view, the types of indentations 136 for which the sealing strips 128 are particularly suited. The indentation 136 at the left-hand side appears generally in the center of the panel between the braces 56, 58 and, while it may be quite deep, it is not too abrupt. The wiper 128 will move into such an indentation very cleanly to wipe its surface clean to prevent the buildup of material thereon. At the right-hand side, a more abrupt indentation 136 is shown just below the brace 56 where it might well occur. Because of the brace, that indentation 136 may be quite abrupt and deep. Nevertheless, the sealing strip 128 will effectively move into the indentation to clean it as the blade 90 moves rearwardly.

I prefer to move the blade assembly 90 by means of a plurality of telescopically related hydraulic power cylinders 150 having a relatively movable end 152 and a relatively fixed end 154. Then, in order to keep the trailer 10 as short as possible and yet provide the needed excursion for the blade assembly 90, I provide a tube 160, which I refer to as a snorkle tube, extending longitudinally rearwardly from the central body portion 92. This tube 160 is centrally located as best seen in FIG. 7. The tube 160 receives a significant portion of the hydraulic power assembly 150 which extends through an opening in the central body portion 92. The relatively movable end 152 of the power cylinder is connected to the rearward end of the tube 160 by means such as indicated at 164. The relatively fixed end 154 of the power assembly is connected to the support 22 as indicated at 166.

I prefer to mount the blade assembly 90 for movement longitudinally by providing, at each side of the blade assembly, a lower slide block 172 riding the upwardly facing guide track 78, 80 and an upper slide block 174 bearing against each downwardly facing guide track 82, 84. These slide blocks 172, 174 preferably extend longitudinally a distance approximately equal to, for instance, two-thirds the height of the blade assembly 90. I believe that the optimum length for the slide blocks 172, 174 may be approximately one-half to two-thirds the height of the blade assembly. I further believe that the slide blocks should extend longitudinally forwardly from a point rearwardly (to the right in FIG. 2) of the central body portion 92. This, I believe, gives the blade assembly the necessary stability needed to keep it in alignment. The slide blocks may be made, for instance, from cast iron or even from hard wood.

As best seen in FIGS. 2, 3 and 4, each slide block 172, 174 is rigidly fastened to the adjacent lower side portion or upper side portion of the blade assembly 90 by means of a longitudinally extending mounting bracket 176 providing a longitudinally and horizontally extending mounting surface 178. The slide block 172, 174 is placed against this mounting surface 178 and held securely thereagainst by means of a plurality of screws 180 which thread into the slide block. Since each lower guide track 78, 80 is in vertical registry with the upper guide track 82, 84 thereabove, I can place shims between each slide block 172, 174 and its mounting surface 178 to provide a vertical adjustment for the slide blocks to compensate for wear which could lead to misalignment problems and maintenance problems.

As best seen in FIG. 4, each slide block includes a rearwardly projecting toe 184 or bevel which tends to remove the hot asphalt or other material from the track upon which the slide block is moving. Finally, the reference numeral 190 indicates the various structural members forwardly of the blade central body portion 92 and between the slide blocks 172, 174. It will be appreciated that these various structural members 190 may be welded together to provide the necessary strength for the blade assembly.

In FIGS. 2 and 6, I have shown a plurality of heavy arrows A, B in an attempt to illustrate the flow of material relative to the blade assembly 90 and the side walls 46, 48 and bottom 42 when the blade assembly moves rearwardly against the material. Very importantly, the arrows A in FIG. 6 show that the material along the side walls 46, 48 is initially turned inwardly from the side walls toward the center of the receptacle before it is moved rearwardly. This action is produced by the side portions 98, 100.

Similarly, the lower and upper portions 94, 96 move the material, respectively, upwardly and downwardly toward the center line 108 before it moves rearwardly. This action is indicated by the arrow B. By causing the material to flow as indicated by the arrows A, B, I can move the material rearwardly of the blade assembly 90 out the open end gate 32 by moving the blade assembly rearwardly and without creating excessive forces pushing laterally outwardly on the side walls and without causing the material to flow upwardly and over the upper edges of the side walls. I believe that the snorkle tube 160 may well have some beneficial characteristics in disturbing the material rearwardly of the blade assembly so that the flow indicated by the arrows A, B can take place.

In my system, the snorkle tube also pushes the end gate 32 open as the blade approaches the rear end to let the material flow out.

Another advantage of the snorkle tube is that it permits the blade to be pulled into the load because the connection 164 is rearwardly of the blade. This helps in the centering of the blade in the receptacle.

I believe that the shape of the blade 90 as described above also tends to center the blade in the receptacle, i.e., in alignment with the tracks 78, 80, 82 and 84.

I believe also that the continuous, uninterrupted sealing strips 128, 140 which engage continuously each side wall and bottom contribute to the success of my system. These sealing strips insure that all of the material will be removed from the side walls and bottoms to prevent build-up which would interfere with the movement of the blade.

I claim:

1. A vehicle for hauling material such as sand, gravel, asphalt mix, sludge, and the like comprising a mobile receptable provided by a bottom having longitudinally extending sides, a rear end, and a forward end, upwardly extending side walls attached, respectively, to said sides, and an end gate adjacent said rear end, said receptacle having an open top, a pusher blade in said receptacle to extend generally from side to side, means for mounting said blade for longitudinal movement between a first position adjacent said forward end and a second position adjacent said rear end, and motor means for longitudinally moving said blade to move such material out said end gate, said blade having a generally rectangular central body portion extending laterally and vertically and facing said rear end, said central body portion having a height not less than one-third the total height of said blade and not more than one-half the total height of said blade, a laterally extending rigid lower portion inclining downwardly and rearwardly from said central body portion to said bottom to exert forces upwardly on the material, a laterally extending rigid upper portion inclining upwardly and rearwardly from said central body portion to exert forces downwardly on the material, and vertically extending rigid side portions inclining outwardly and rearwardly from the opposite sides of said central body portion to said side walls to exert forces inwardly on the material, said side portions inclining outwardly and rearwardly at substantially the same angle, and said upper portion inclining upwardly and rearwardly at substantially the same angle as said lower portion inclines downwardly and rearwardly and said upper portion and lower portion being substantially equal in height, so that, when the blade is moved rearwardly, the forces exerted on the material by the blade are centralized toward the center of the blade to reach equilibrium so that the material can move as a block with said blade toward said end gate.

2. The invention of claim 1 in which said upper and lower portions incline upwardly and downwardly, respectively, at approximately 45°.

3. The invention of claim 1 including flexible rubber-like seal means extending continuously along the rearward edges of said side portions and along the rearward edge of said lower portion to engage and scrape material from said side walls and bottom as said blade moves from its first position to its second position, said seal means resiliently engaging said side walls and bottom to maintain contact with portions thereof which are concave and convex.

* * * * *